(12) United States Patent
Yeh

(10) Patent No.: US 10,036,530 B2
(45) Date of Patent: Jul. 31, 2018

(54) NONLINEAR OPTICAL ASSEMBLY OF AN ALERT LIGHT

(71) Applicant: Neng-Chen Yeh, Tainan (TW)

(72) Inventor: Neng-Chen Yeh, Tainan (TW)

( * ) Notice: Subject to any disclaimer, the term of this patent is extended or adjusted under 35 U.S.C. 154(b) by 168 days.

(21) Appl. No.: 15/248,591

(22) Filed: Aug. 26, 2016

(65) Prior Publication Data
US 2016/0363287 A1 Dec. 15, 2016

Related U.S. Application Data

(60) Division of application No. 14/697,629, filed on Apr. 28, 2015, now Pat. No. 9,638,391, and a continuation-in-part of application No. 14/060,425, filed on Oct. 22, 2013, now Pat. No. 9,188,306.

(51) Int. Cl.
| | |
|---|---|
| *F21V 5/04* | (2006.01) |
| *F21V 5/00* | (2018.01) |
| *G02B 19/00* | (2006.01) |
| *F21V 17/10* | (2006.01) |
| *G02B 3/08* | (2006.01) |
| *F21W 111/00* | (2006.01) |
| *F21Y 101/00* | (2016.01) |
| *F21Y 115/10* | (2016.01) |

(52) U.S. Cl.
CPC .............. *F21V 5/007* (2013.01); *F21V 5/04* (2013.01); *F21V 17/104* (2013.01); *G02B 19/0061* (2013.01); *G02B 19/0066* (2013.01); *F21W 2111/00* (2013.01); *F21Y 2101/00* (2013.01); *F21Y 2115/10* (2016.08)

(58) Field of Classification Search
CPC .......... F21V 5/007; F21V 5/04; F21V 17/104; G02B 19/0061; G02B 19/0066
See application file for complete search history.

(56) References Cited

U.S. PATENT DOCUMENTS

| | | | |
|---|---|---|---|
| 4,482,941 A | 11/1984 | Lindner | |
| 7,712,931 B1 * | 5/2010 | Smith | B60Q 1/2611 362/308 |
| 8,177,597 B2 * | 5/2012 | Kolb | F21V 5/046 362/327 |
| 2005/0146269 A1 * | 7/2005 | Chiang | F21V 5/048 313/512 |
| 2006/0082999 A1 | 4/2006 | Klein | |
| 2011/0194279 A1 | 8/2011 | Kuo | |

* cited by examiner

*Primary Examiner* — Elmito Breval
*Assistant Examiner* — Nathaniel Lee
(74) *Attorney, Agent, or Firm* — Tracy Heims; Apex Jurls, pllc.

(57) ABSTRACT

A nonlinear optical assembly of alert light has two nonlinear optical halves obtained by symmetrically dividing the nonlinear optical assembly along an optical reference plane. Each optical half has a base, which takes a nonlinear and curved form with one side thereof corresponding to the optical reference plane and having a junction surface. A light entrance portion and a light exit portion are on two opposite sides of the optical reference plane. The two optical halves are assembled to form the nonlinear optical assembly with the junction surfaces therebetween. The nonlinear optical assembly reduces molding and manufacturing requirements. Given the light exit portions of the optical halves, each light entrance portion corresponds to multiple bulged portions for the nonlinear optical assembly to provide uniform lighting effect.

2 Claims, 15 Drawing Sheets

NONLINEAR OPTICAL ASSEMBLY OF AN ALERT LIGHT

CROSS REFERENCE TO RELATED APPLICATIONS

This application is a divisional application of the U.S. application Ser. No. 14/697,629, filed on Apr. 28, 2014.

BACKGROUND OF THE INVENTION

1. Field of the Invention

The present invention relates to an optical assembly, and, more particularly, to a nonlinear optical assembly of an alert light.

2. Description of the Related Art

As having the advantages of being compact in size, low-power-consuming, and durable, light-emitting diodes (LED) have gradually replaced conventional light bulbs to become one of the major lighting sources, and have been extensively applied to all sorts of lighting applications and alert lights.

As far as the composition of a conventional LED alert light is concerned, the conventional LED alert light includes an LED module and an optical lens module. Depending on the number of LED in the LED module, the optical lens module is integrally formed with multiple lens units. The lens units are sequentially aligned in the form of a straight line. A light entrance end of each lens unit corresponds to an LED of the LED module to thereby constitute an LED alert light.

Although the conventional LED alert light can be applied to products with alert features, the optical lens module of the conventional LED alert light employs multiple integrally-formed lens units, and under the constraint of forming technique, each lens unit of the optical lens module takes the form of a cone with a cone apex angle approximately at 120 degrees. The conical shape of the lens units makes the integrally-formed optical lens module inflexible for significant changes and hard to adapt to the requirements of different forms of light projection. As a result, conventional alert lights can be designed to provide single-side straight-line light projection but fail to provide arced, wavy or annular light projection in response to the demand of diversified alert lights.

In spite of attempts of manufacturers in the related field to integrally form arcuate, wavy or annular optical assemblies, forming those nonlinear optical assemblies is a tough job to tackle. Thus, the molding and manufacturing requirements of the optical assemblies are rather high, rendering light projected therefrom non-uniform.

Moreover, concerns of light entering and exiting the nonlinear optical assemblies differ from those of linear optical assemblies. In view of different curvatures for non-linear and linear optical assemblies, uniform light projected by the light exit portions of the nonlinear optical assemblies should be prioritized. However, corresponding in-depth development on conventional nonlinear optical assemblies is not available and the resulting uniformity of light exiting therefrom is not satisfactory.

U.S. Pat. No. 7,712,931, US 2006/0082999 and US 2011/0194279 involve linear optical assemblies. The present invention differs from the foregoing citations and further explores more different embodiments in continuation with the development of the nonlinear optical assembly of an alert light.

SUMMARY OF THE INVENTION

An objective of the present invention is to provide a nonlinear optical assembly of an alert light for solving the problems of conventional alert lights, that is, optical lens elements are hard to adapt to different light form variations, such as arcuate, annular and wavy forms, because of their integrally-formed structure.

To achieve the foregoing objective, the nonlinear optical assembly of an alert light has two nonlinear optical halves obtained by symmetrically dividing the nonlinear optical assembly along an optical reference plane. Each nonlinear optical half has a base, a light entrance portion, and a light exit portion.

One side of the base corresponds to the optical reference plane and has a junction surface. The two nonlinear optical halves are assembled to form the nonlinear optical assembly with the junction surfaces of the two nonlinear optical halves attached to each other.

The light entrance portion is formed on one side of the base and adjoins the junction surface.

The light exit portion is formed on another side of the base and adjoins the junction surface.

Given the structure of the foregoing nonlinear optical assembly of alert light, the nonlinear optical assembly can be symmetrically divided into two separate optical halves along an optical reference plane. The divided optical halves are structurally simplified and therefore facilitate the molding thereof in production and the quality of the finished product. After reducing limitations upon molding specific optical halves, light form, light projection angle or product shape can be varied according to desired alert feature to make structural changes to the nonlinear optical assembly on its entirety. Additionally, because of the symmetrical shapes of the two optical halves, light emitted from an alert light having the nonlinear optical assembly passes through a center line of the light exit portion, thereby generating a uniform light effect.

Other objectives, advantages and novel features of the invention will become more apparent from the following detailed description when taken in conjunction with the accompanying drawings.

DETAILED DESCRIPTION OF THE INVENTION

Figure 1:
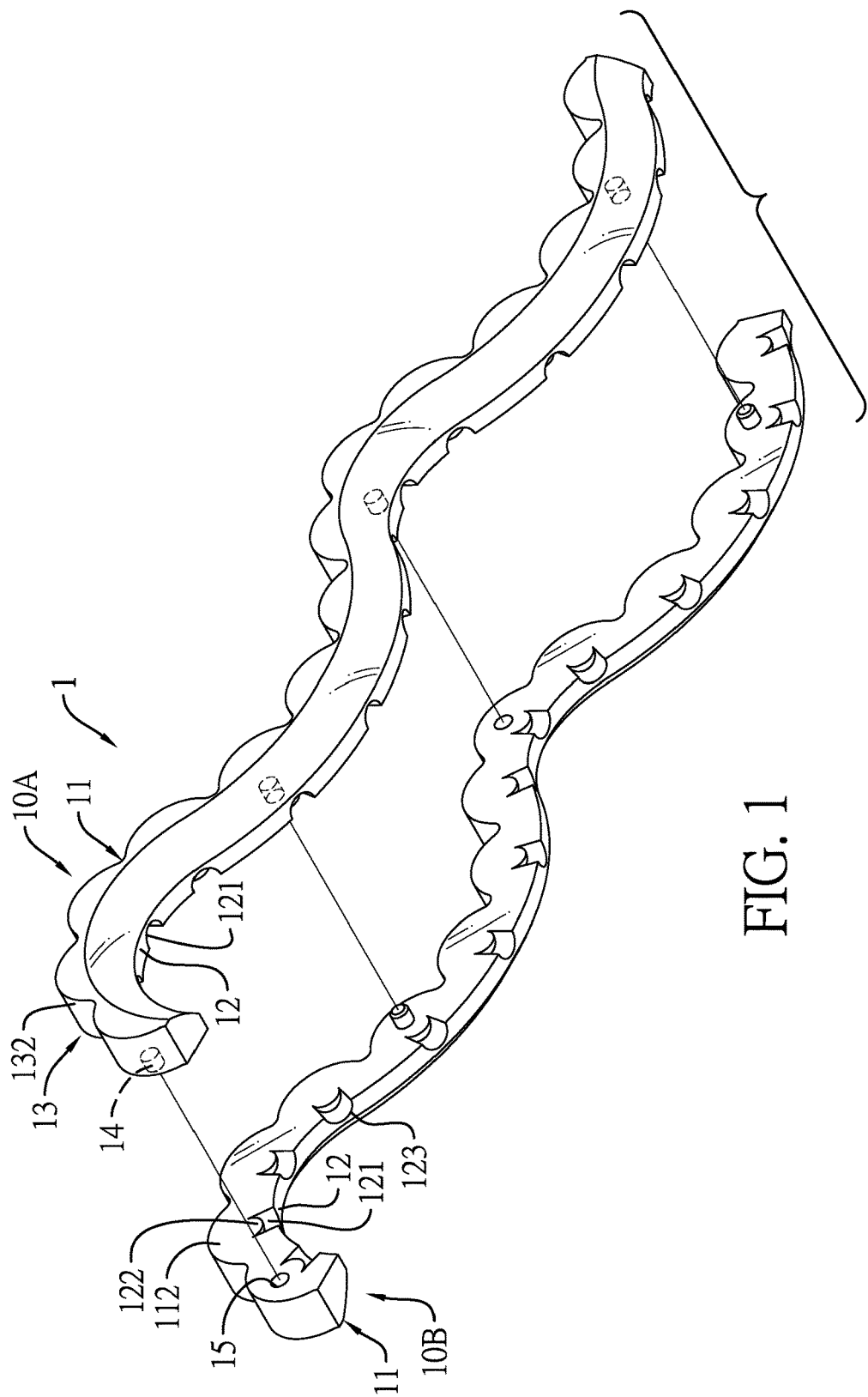
FIG. 1 is an exploded perspective view of a first embodiment of a nonlinear optical assembly of an alert light in accordance with the present invention.

With reference to FIGS. 1, 2, 7 and 11, four embodiments of a nonlinear optical assembly of an alert light in accordance with the present invention are shown and have common features as follows. Each of the embodiments of the nonlinear optical assembly 1 of an alert light has two separate nonlinear optical halves 10A, 10B. Each embodiment of the nonlinear optical assembly has a specific form. The nonlinear optical halves 10A, 10B are obtained by symmetrically dividing the nonlinear optical assembly 1 along an optical reference plane 'P' as shown in FIG. 3. The optical reference plane corresponds to a virtual plane defined by center points of multiple light-emitting diodes (LEDs) in an LED module of the alert light. Each nonlinear optical half 10A, 10B has a base 11, a light entrance portion 12, and a light exit portion 13. The base 11 takes a nonlinear and curved form and is integrally formed. One side of the base 11 corresponding to the optical reference plane has a junction surface 112. The light entrance portion 12 is formed on one side of the base 11 and adjoins the junction surface 112. The light exit portion 13 is formed on another side of the base 11, adjoins the junction surface 112, and is opposite to the light entrance portion 12. The two optical halves 10A, 10B are made of a transparent material, which may be glass, polymethylmethacrylate (PMMA), and the like. The optical halves 10A, 10B respectively have at least one first jointing member 14 and at least one second jointing member 15 respectively formed on at least one position on the base 11 of the optical halve 10A and on at least one position on the base 11 of the other optical half 10B. The first jointing member 14 and the second jointing member 15 are respectively a raised portion and a recessed portion matching each other. The two optical halves 10A, 10B are assembled together by correspondingly engaging the at least one first jointing member 14 and the at least one second jointing member 15 with the junction surfaces 112 of the two optical halves 10A, 10B attached to each other for forming the nonlinear optical assembly 1.

With reference to FIG. 1, a first embodiment of a nonlinear optical assembly 1 in accordance with the present invention takes a wavy and elongated form and has two nonlinear optical halves 10A, 10B. The base 11 has multiple light entry recesses 121 formed in the light entrance portion 12 and spaced apart from each other by gaps. Each light entry recess 121 takes the form of a semi-cylindrical hole, and has a semicircular opening 123 and a quadra-spherical lens portion 122. The semicircular opening 123 corresponds to an inner opening of the light entry recess 121. The quadra-spherical lens portion 122 is formed on an inner wall of the light entry recess 121 opposite to the semicircular opening 123. The light exit portion 13 has multiple bumps 132 juxtaposedly formed on the light exit portion 13 in a wavy manner, and each bump 132 has an arcuate profile, protrudes outwards from the light exit portion 13, and is aligned with one of the multiple light entry recesses 121.

Figure 2:
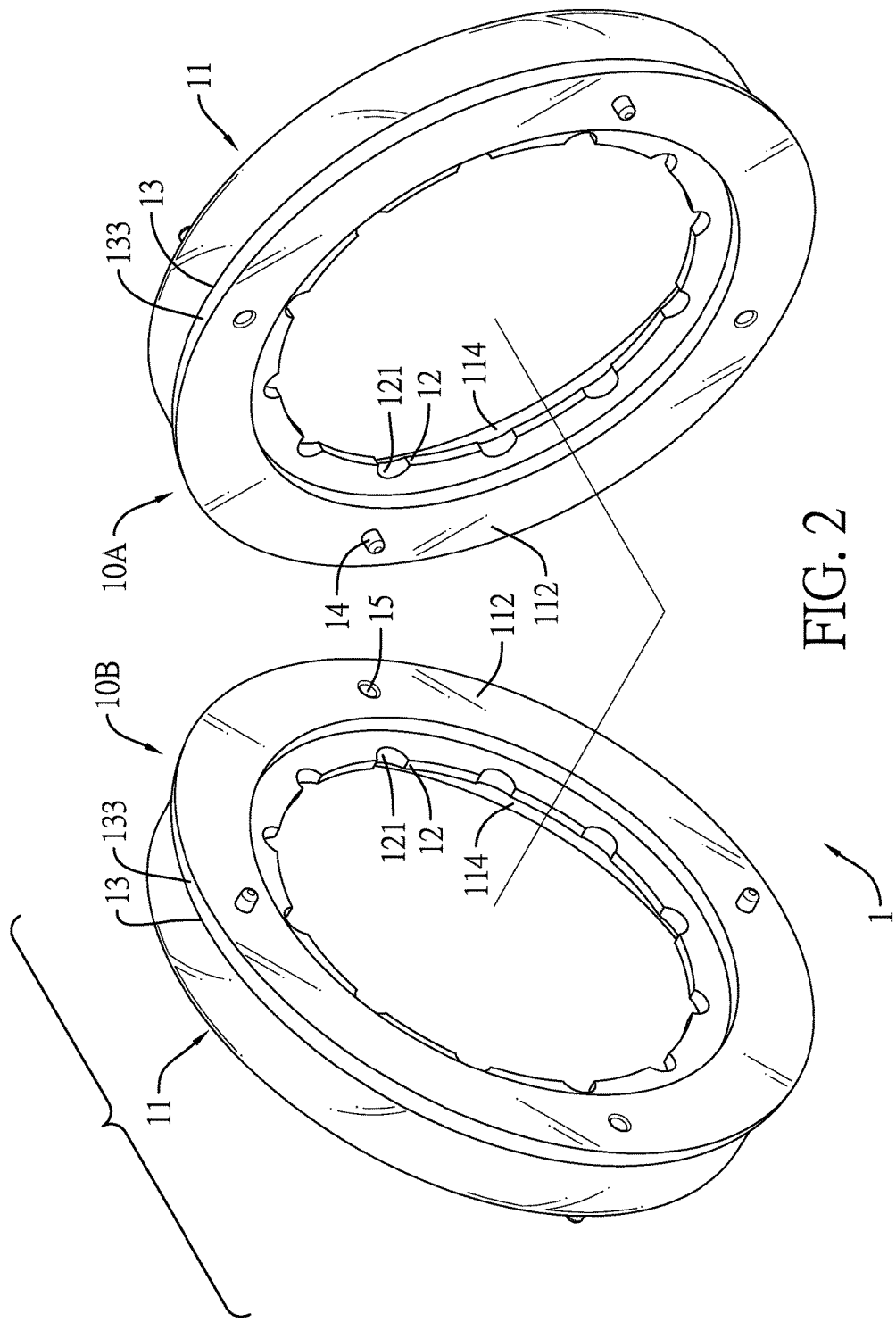
FIG. 2 is an exploded perspective view of a second embodiment of a nonlinear optical assembly of an alert light in accordance with the present invention.
Figure 3:
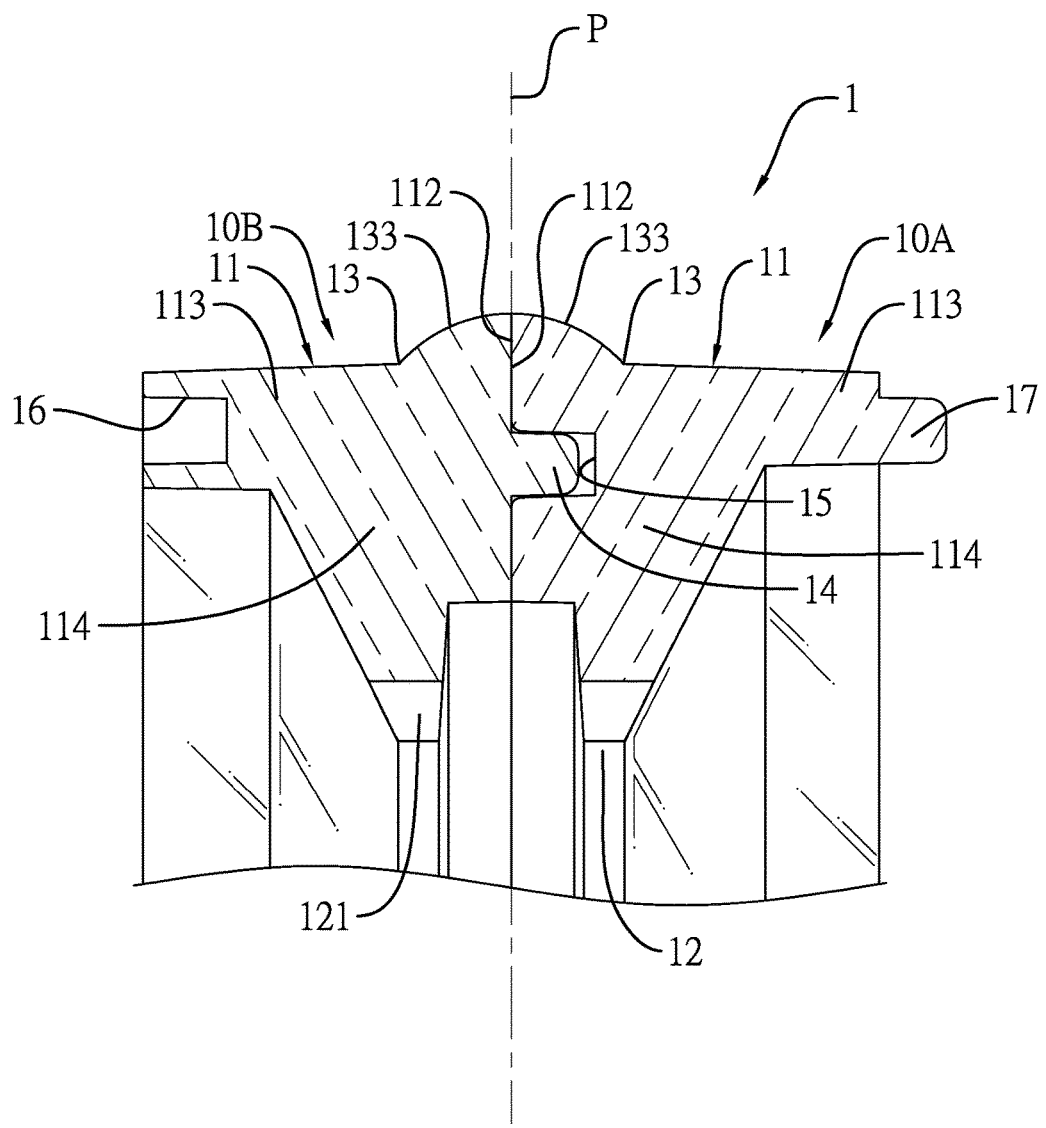
FIG. 3 is an enlarged partial cross-sectional view of the nonlinear optical assembly in FIG. 2, shown combined.

With reference to FIGS. 2 and 3, a second embodiment of a nonlinear optical assembly 1 of an alert light in accordance with the present invention is shown. The base 11 of each optical half 10A, 10B takes an annular form. The light entrance portion 12 of the base 11 corresponds to an inner circumferential end surface of the base 11, and has multiple light entry recesses 121. The multiple light entry recesses 121 are annularly formed in the light entrance portion 12 and are mutually spaced apart by gaps. Each light entry recess 121 takes the form of an arcuate indentation. The light exit portion 13 of the base 11 corresponds to an outer circumferential end surface of the base 11, and has an outer raised portion 133. The outer raised portion 133 is annularly formed around a portion of the light exit portion 13 and is adjacent to the junction surface 112 of the base 11. The base 11 further has an outer flange 113 and an inner bevel wall 114. The outer flange 113 is annularly formed on and protrudes outwards from the outer raised portion 133 in a direction vertical to and away from the junction surface 112. The inner bevel wall 114 is annularly formed on and protrudes inwards from an inner wall of the outer flange 113, and reduces in thickness in a direction from the outer flange 113 to the light entry recesses 121. The outer flange 113 can function as a light-exiting portion of the light exit portion 13, and an inner end of the inner bevel wall 114 can function as a light entry portion of the light entrance portion 12.

Figure 4:
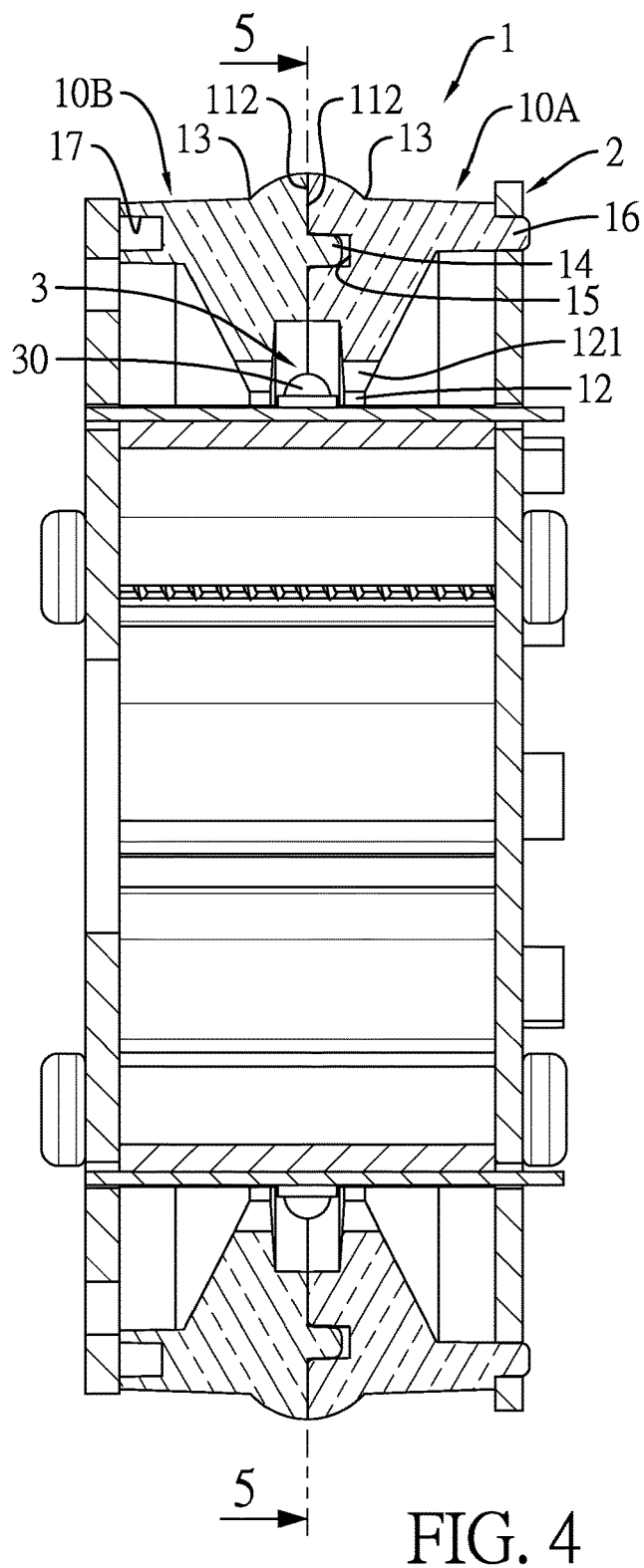
FIG. 4 is a cross-sectional view of the combined nonlinear optical assembly in FIG. 2 applied to an alert light.
Figure 5:
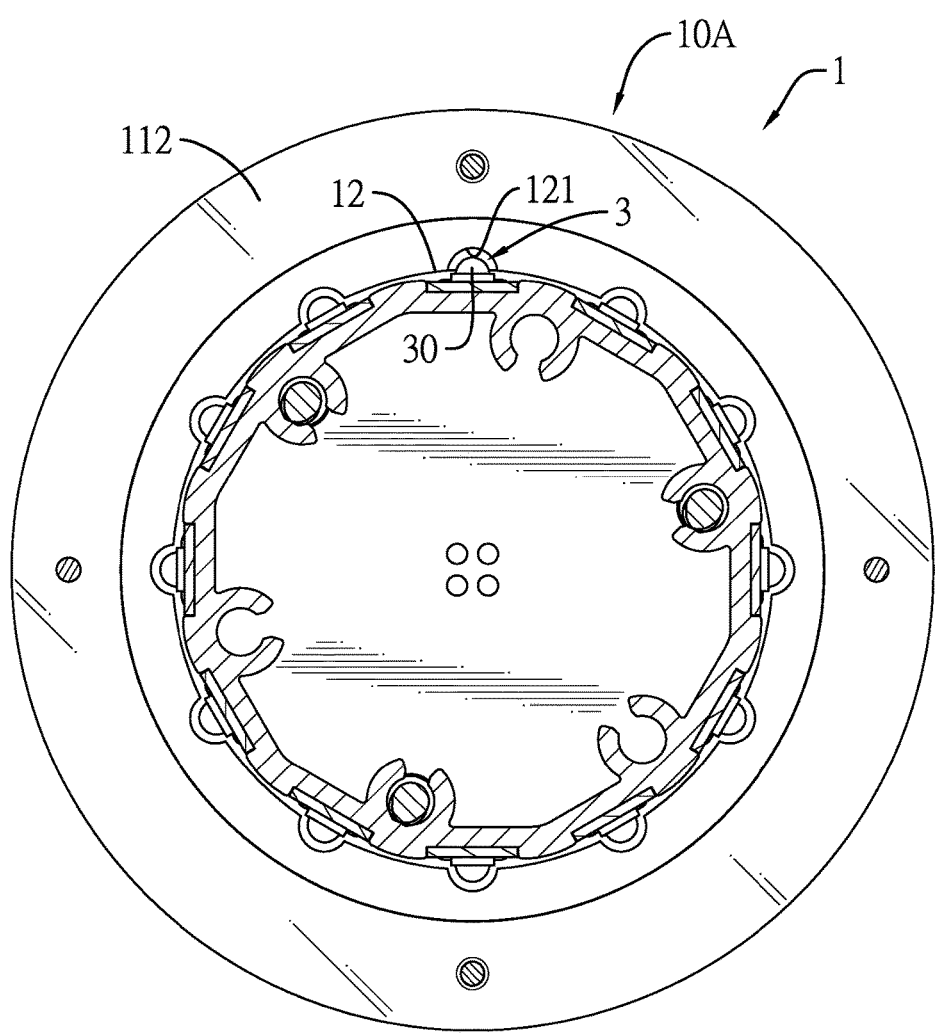
FIG. 5 is a cross-sectional view of the combined nonlinear optical assembly taken along line 5-5 in FIG. 4.
Figure 6:
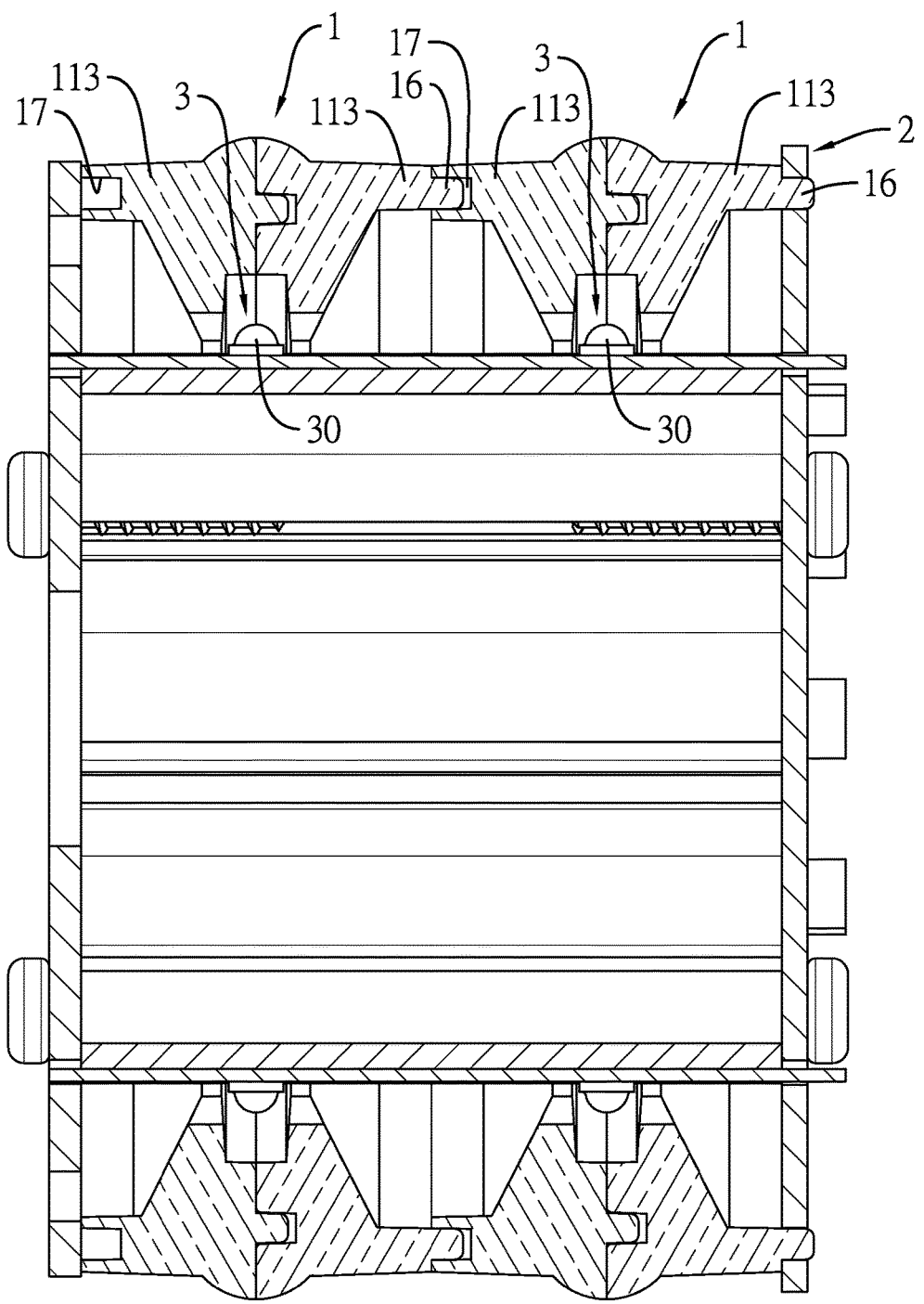
FIG. 6 is a cross-sectional view of two combined optical assemblies in FIG. 2 applied to an alert light.
Figure 7:
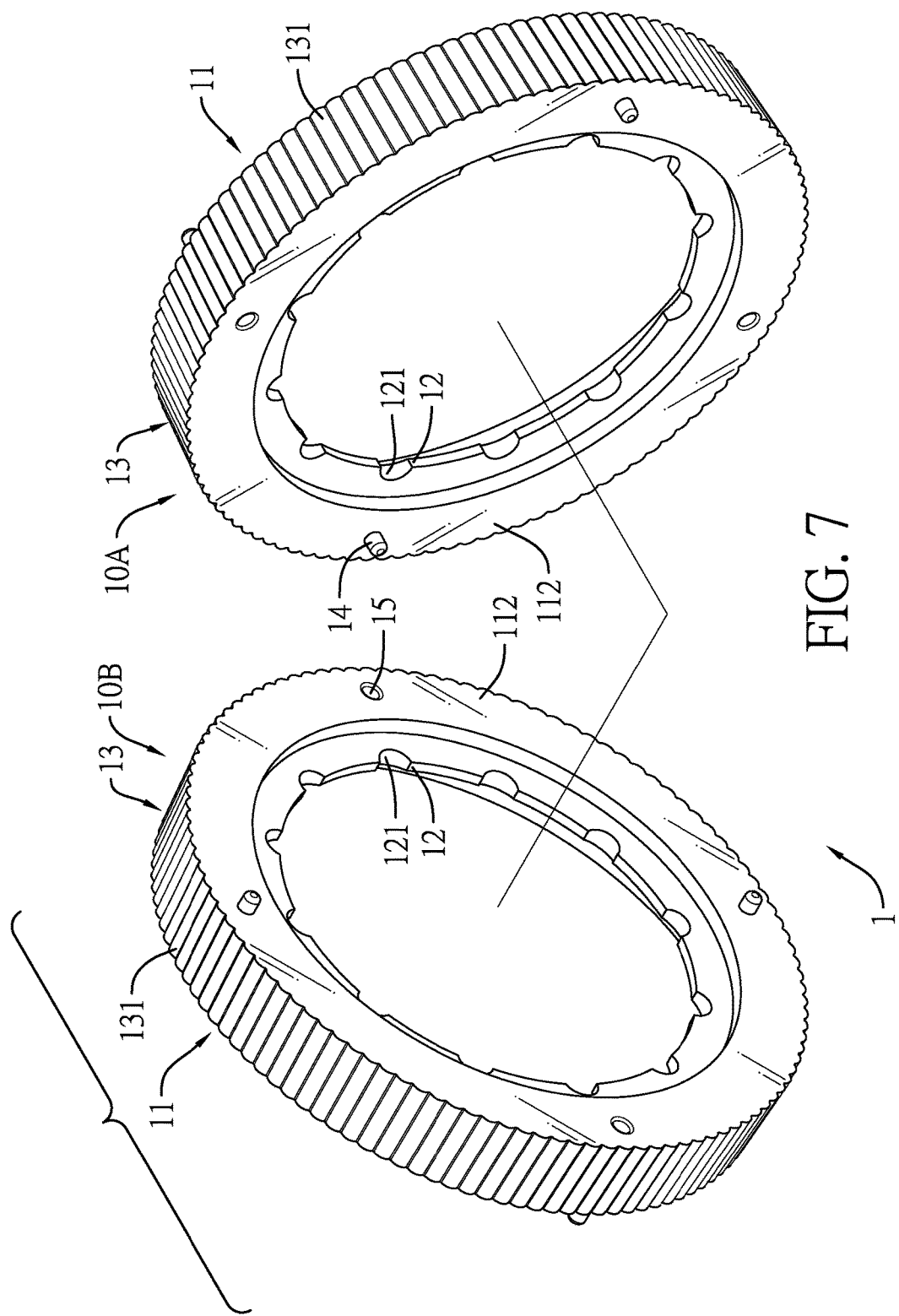
FIG. 7 is an exploded perspective view of a third embodiment of a nonlinear optical assembly of an alert light in accordance with the present invention.
Figure 8:
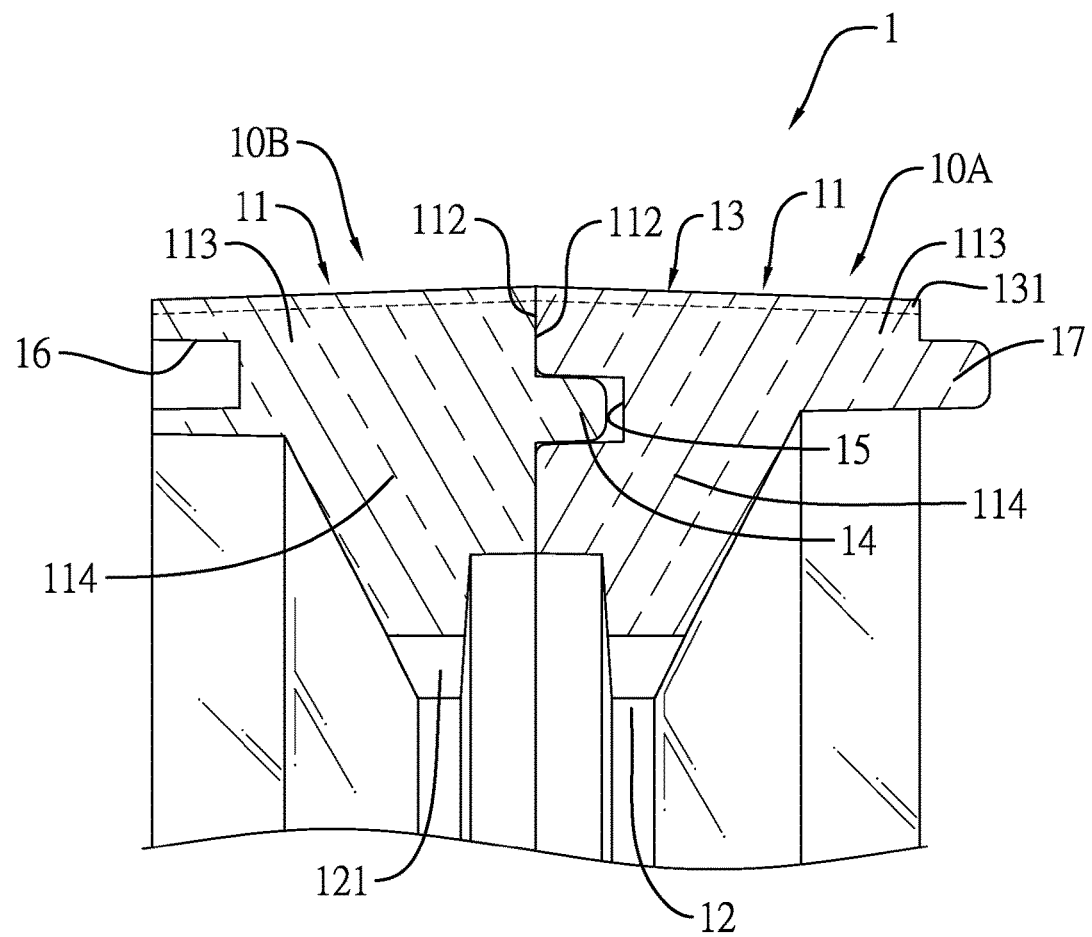
FIG. 8 is an enlarged partial cross-sectional view of the nonlinear optical assembly in FIG. 7, shown combined.
Figure 9:
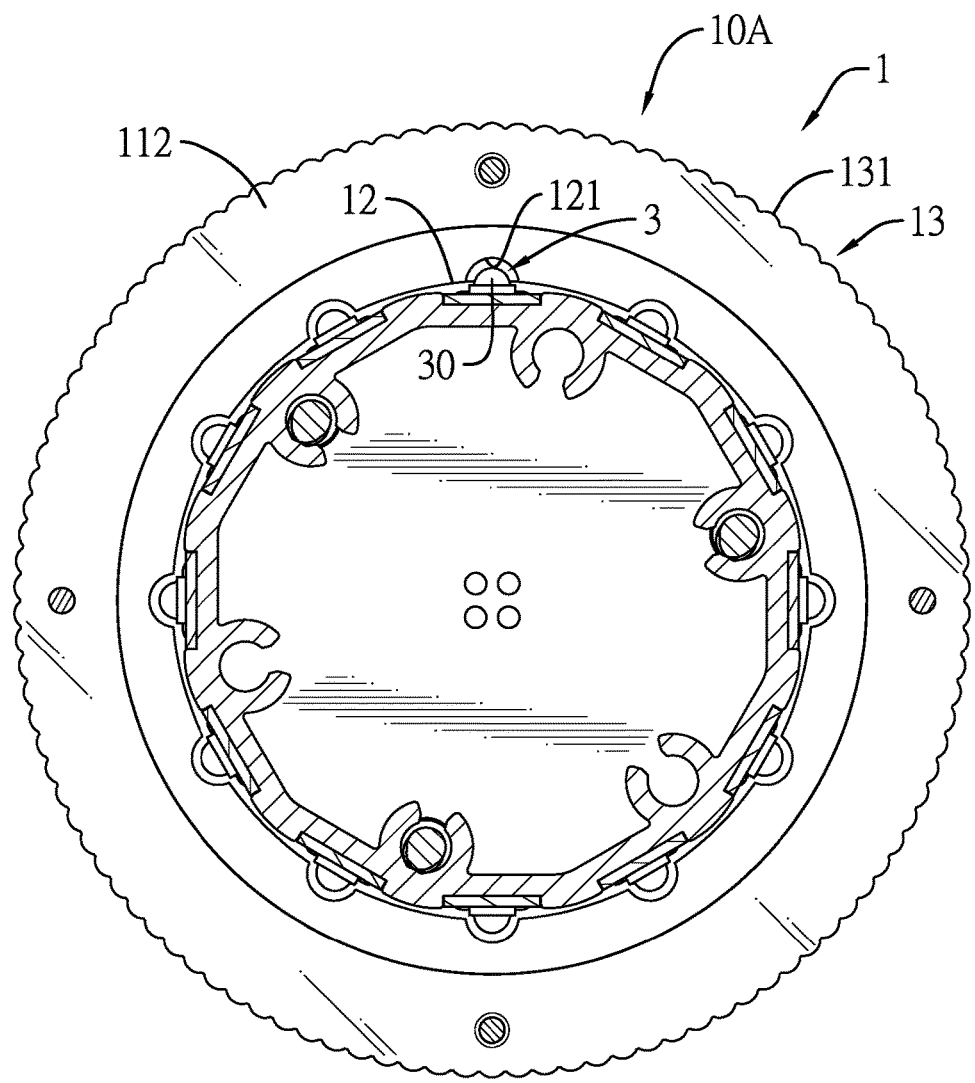
FIG. 9 is a cross-sectional view of the combined nonlinear optical assembly in FIG. 7.
Figure 10:
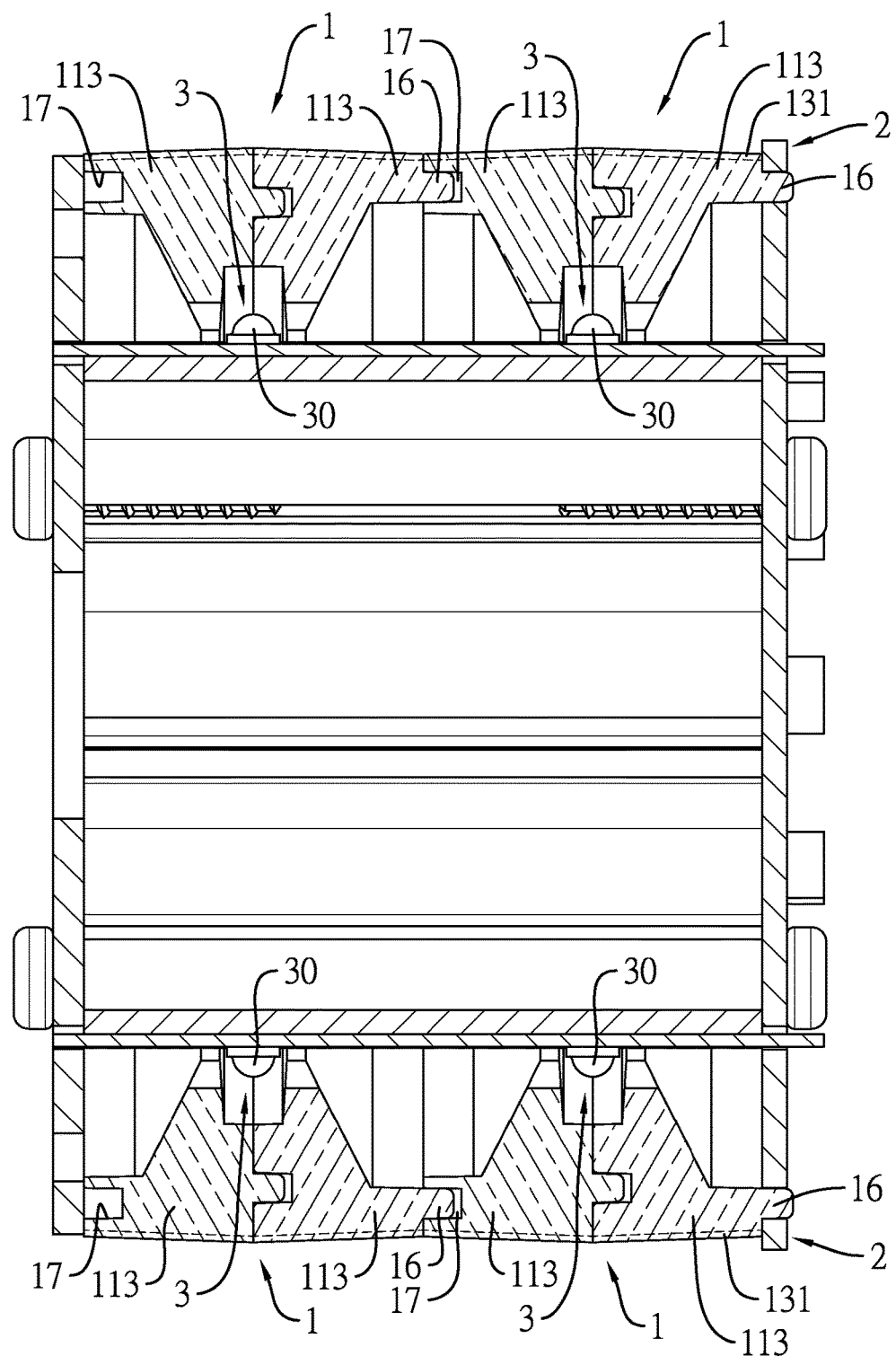
FIG. 10 is a cross-sectional view of two combined optical assemblies in FIG. 7 applied to an alert light.
Figure 11:
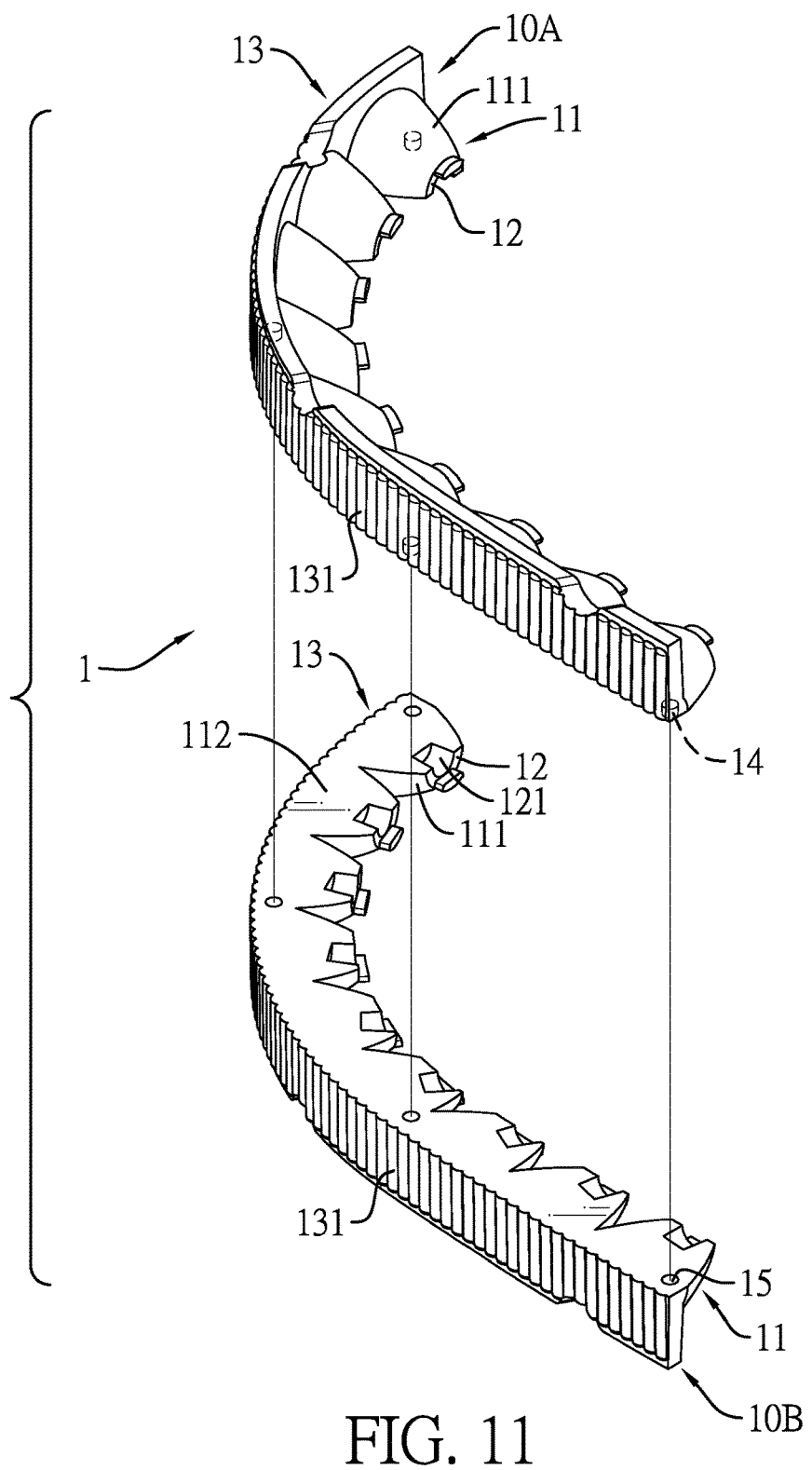
FIG. 11 is an exploded perspective view of a fourth embodiment of a nonlinear optical assembly of an alert light in accordance with the present invention.
Figure 12:
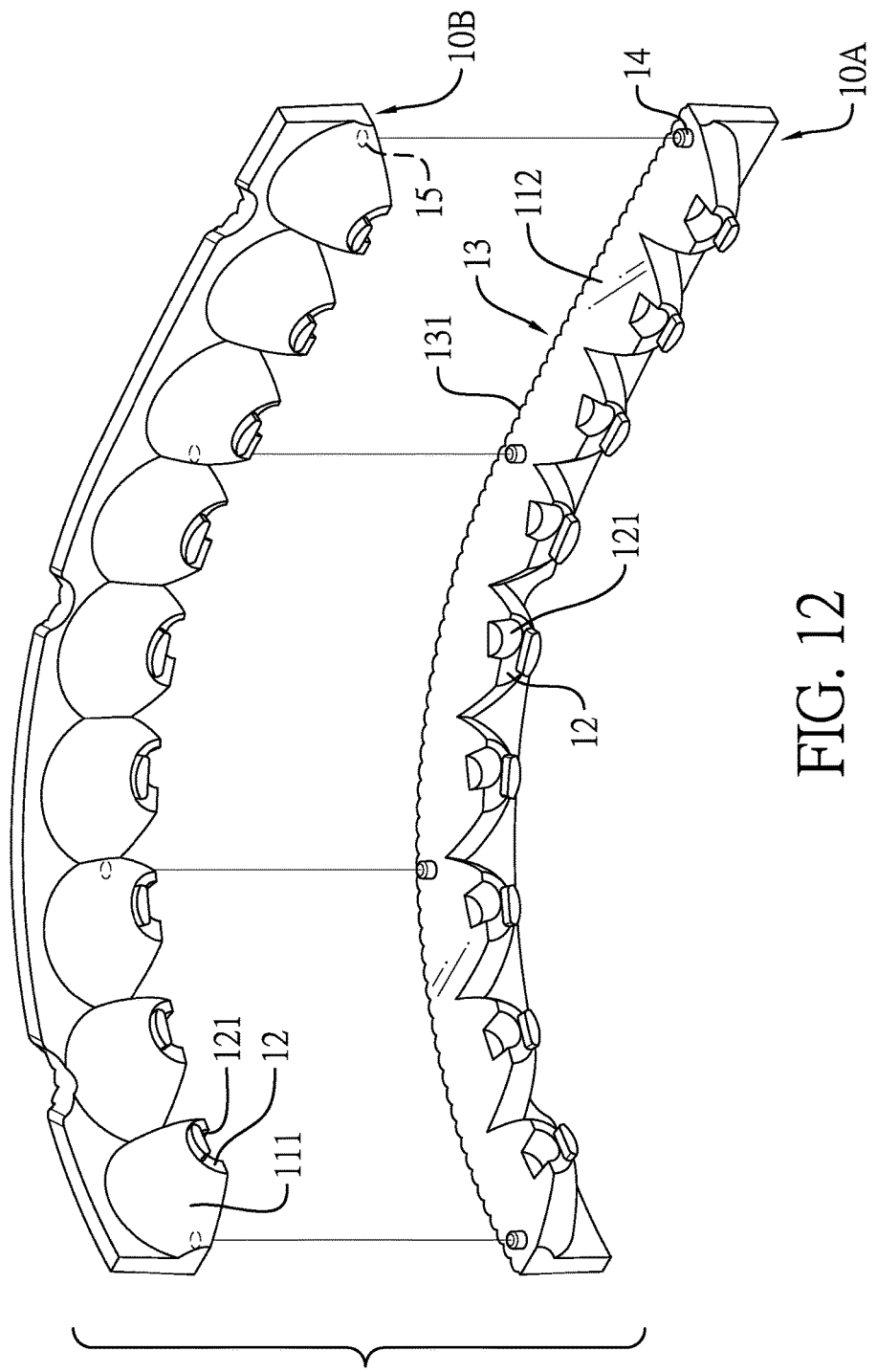
FIG. 12 is another exploded perspective view of the nonlinear optical assembly in FIG. 11.

With reference to FIGS. 3 to 5, the two nonlinear optical halves 10A, 10B of a nonlinear optical assembly in the present embodiment respectively have a lateral pin 16 and a lateral hole 17 respectively formed on and formed in two outer edges of the outer flanges 113 of the optical halves 10A, 10B that are opposite to the junction surface 112. The lateral pin 16 and the lateral hole 17 are used for assembling the nonlinear optical assembly and a lamp holder 2 of the alert light together. With reference to FIG. 6, when multiple nonlinear optical assemblies 1 are mounted inside the lamp holder 2 of an alert light in a juxtaposed manner, the lateral pins 16 and the lateral holes 17 of the bases 11 of the nonlinear optical assemblies 1 can be used to assemble the nonlinear optical assemblies 1 and the lamp holder 2 together.

With reference to FIGS. 2 to 6, detailed description about assembly and operation of the nonlinear optical assembly in the present embodiment applied to an alert light is introduced as follows. The nonlinear optical assembly that is combined by assembling the two nonlinear optical halves 10A, 10B together is mounted inside the lamp holder 2. The light exit portion 13 of the nonlinear optical assembly is exposed to an ambient environment. An LED module 3 is mounted inside the lamp holder 2 and is located inside the nonlinear optical assembly. Each LED 30 of the LED module 3 corresponds to the light entrance portions 12 of the two corresponding optical halves 10A, 10B. An annular alert light can be thus assembled. With reference to FIGS. 5 and 6, when the LED module 3 is connected to a power source and the LEDs 30 are lighted up, light emitted from each LED 30 propagates through corresponding light entry recesses 121 and the bases 11 of the two optical halves 10A, 10B and is scattered out through the light exit portions 13 of the bases 11, so that the alert light demonstrates the light effect of an annular alert light.

With reference to FIGS. 7 to 10, a third embodiment of a nonlinear optical assembly 1 of an alert light in accordance with the present invention differs from the second embodiment in that instead of the outer raised portion 133 in the second embodiment, the present embodiment has multiple bulged projection portions 131 juxtaposedly formed around the light exit portion 13. Each bulged projection portion 131 has an arcuate profile. Each light entry recess 121 corresponds to a number of bulged projection portions 131 adjacent to the light entry recess 121, such that light that is emitted from each LED 30 and propagates through the nonlinear optical assembly 1 will pass through corresponding bulged projection portions 131. Due to the arcuate profile of each bulged projection portion 131, light passing through the bulged projection portions 131 is projected to different directions. Accordingly, luminance of light projected through the entire light exit portion 13 of the nonlinear optical assembly 1 can be substantially the same and uniform luminance of the alert light can be ensured.

Figure 13:
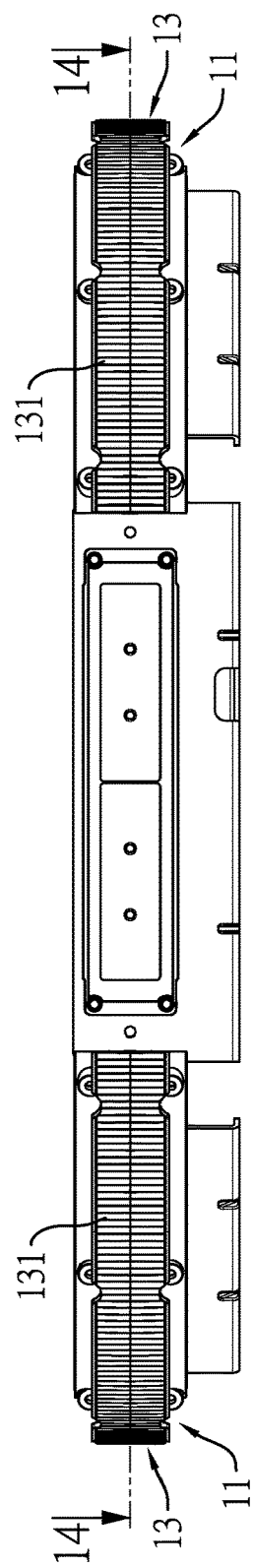
FIG. 13 is a side view of four combined optical assemblies in FIG. 11 applied to an alert light.
Figure 14:
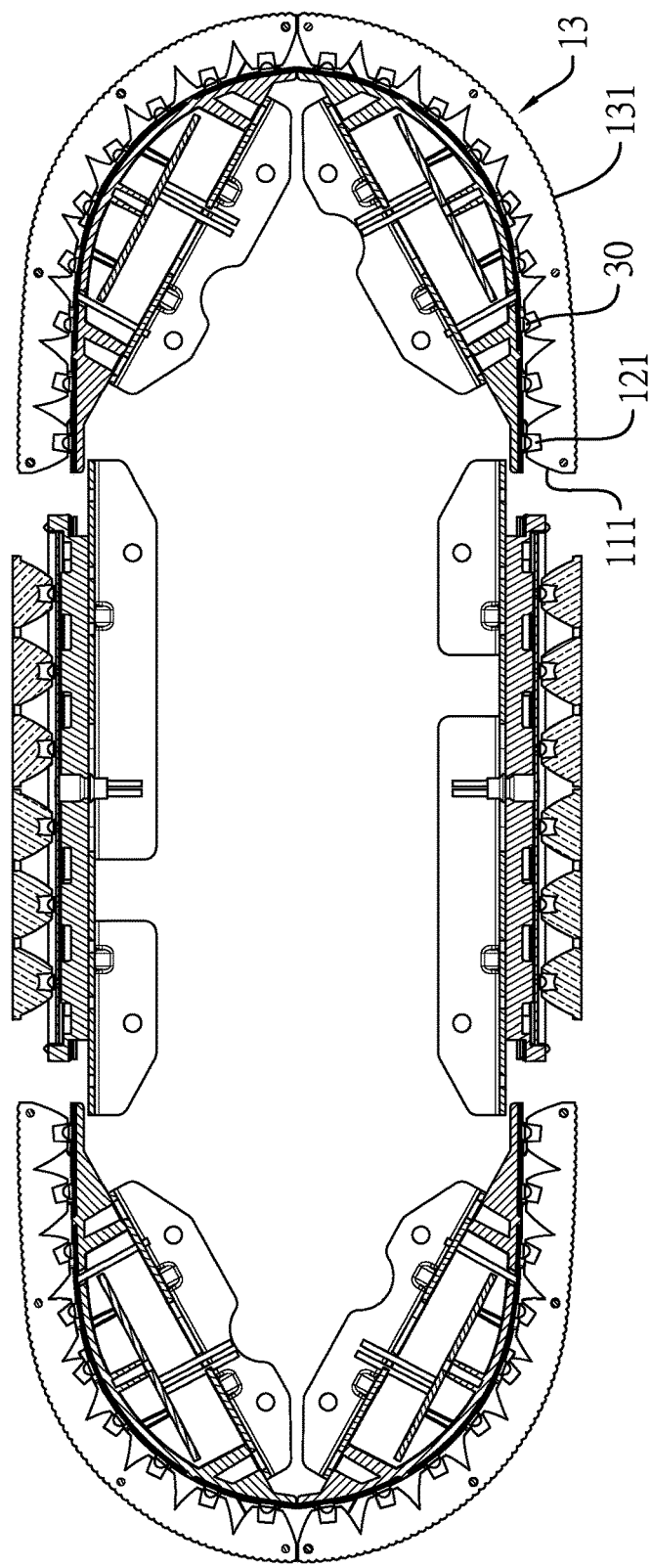
FIG. 14 is a cross-sectional view of four combined optical assemblies in FIG. 11 applied to an alert light.
Figure 15:
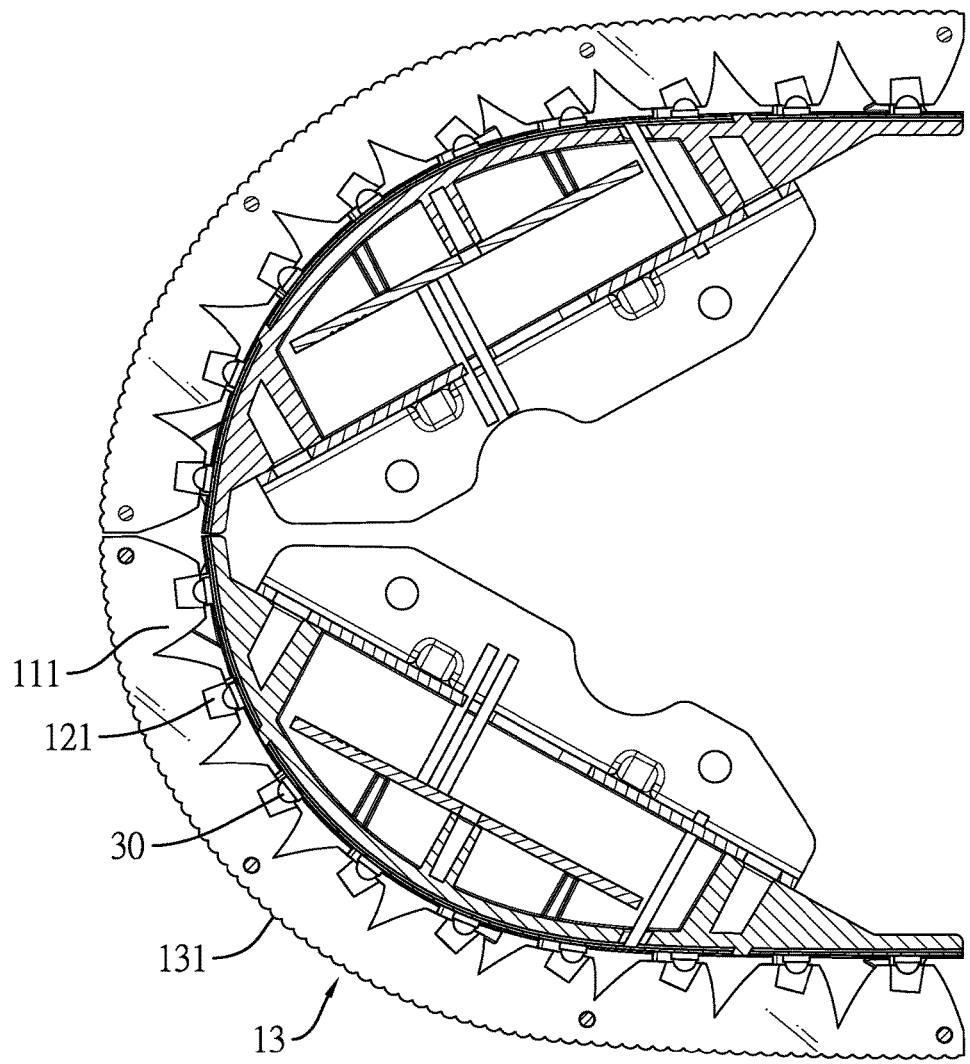
FIG. 15 is an enlarged cross-sectional view of two combined optical assemblies in FIG. 14.

With reference to FIGS. 11 to 15, a fourth embodiment of a nonlinear optical assembly 1 of an alert light in accordance with the present invention takes an arcuate and elongated form. The base 11 is integrally formed and has multiple half LED cases 111. The half LED cases 111 are juxtaposedly arranged along an arc on the light entrance portion 12. Each half LED case 111 is formed in the light entrance portion 12, and takes the form of a semicircular cone with diameters of cross sections of the half LED case 111 perpendicular to the junction surface 112 progressively increasing in a direction from the light entrance portion 12 to the light exit portion 13. Each half LED case 111 has a light entry recess 121 formed in a portion of the light entrance portion 12 corresponding to the half LED case 111. The light exit portion 13 has multiple bulged projection portions 131 juxtaposedly and arcuately formed on the light exit portion 13. Each bulged projection portion 131 has an arcuate profile. Each light entry recess 121 corresponds to a number of bulged projection portions 131 adjacent to the light entry recess 121, such that light that is emitted from each LED 30 and propagates through the nonlinear optical assembly 1 will pass through corresponding bulged projection portions 131. Due to the arcuate profile of each bulged projection portion 131, light passing through the bulged projection portions 131 is projected to different directions. Accordingly, luminance of light projected through the entire light exit portion 13 of the nonlinear optical assembly 1 can be substantially the same and uniform luminance of the alert light can be ensured. With further reference to FIGS. 13 to 15, multiple nonlinear optical assemblies in the present embodiment are applied to an alert light.

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:

1. A nonlinear optical assembly of an alert light, comprising two nonlinear optical halves obtained by symmetrically dividing the nonlinear optical assembly along an optical reference plane, wherein each nonlinear optical half has:
   a base integrally formed and taking a wavy form, wherein one side of the base corresponding to the optical reference plane has a junction surface, and the two nonlinear optical halves are assembled to form the nonlinear optical assembly with the junction surfaces of the two nonlinear optical halves attached to each other;
   a light entrance portion formed on the side of the base and adjoining the junction surface; and
   a light exit portion formed on another side of the base and adjoining the junction surface;
   wherein
   the base has:
      multiple light entry recesses formed in the light entrance portion and spaced apart from each other by gaps, each light entry recess taking the form of a semi-cylindrical hole and having:
         a semicircular opening corresponding to an inner opening of the light entry recess; and
         a quadra-spherical lens portion formed on an inner wall of the light entry recess opposite to the semicircular opening; and
      the light exit portion has multiple bumps juxtaposedly formed on the light exit portion in a wavy manner, wherein each bump has an arcuate profile, protrudes outwards from the light exit portion, and is aligned with one of the multiple light entry recesses.

2. The nonlinear optical assembly as claimed in claim 1, wherein the nonlinear optical halves respectively have at least one first jointing member and at least one second jointing member respectively formed on at least one position on the base of one of the nonlinear optical halves and on at least one position on the base of the other nonlinear optical half, each of the at least one first jointing member and each of the at least one second jointing member are respectively a raised portion and a recessed portion matching each other.

* * * * *